United States Patent [19]

Akai

[11] Patent Number: 4,903,190
[45] Date of Patent: Feb. 20, 1990

[54] DATA COLLECTING METHOD AND APPARATUS FOR LOOP-LINKED CONTROL SYSTEM

[75] Inventor: Takumi Akai, Fuchu, Japan

[73] Assignee: Kabushiki Kaisha Toshiba, Kawasaki, Japan

[21] Appl. No.: 150,049

[22] Filed: Jan. 29, 1988

[30] Foreign Application Priority Data

Jan. 30, 1987 [JP] Japan .................. 62-18695

[51] Int. Cl.⁴ .................. G06F 15/46; G06F 13/00
[52] U.S. Cl. .................. 364/131; 364/134; 364/200; 364/229.3
[58] Field of Search .................. 364/130–137, 364/551, 200, 900, 551.01; 371/10, 21, 22, 34, 68; 370/86, 88; 340/825.05, 825.06

[56] References Cited

U.S. PATENT DOCUMENTS

| | | | |
|---|---|---|---|
| 4,410,944 | 10/1983 | Kronies | 364/134 |
| 4,500,951 | 2/1985 | Sugimoto et al. | 364/200 |
| 4,547,879 | 10/1985 | Hamelin et al. | 370/86 |
| 4,646,232 | 2/1987 | Chang et al. | 364/200 |
| 4,755,991 | 7/1988 | Göertz | 370/22 |
| 4,763,254 | 8/1988 | Mori et al. | 370/86 |
| 4,789,986 | 12/1988 | Koizumi et al. | 371/22 |

Primary Examiner—Joseph Ruggiero
Attorney, Agent, or Firm—Oblon, Spivak, McClelland, Maier & Neustadt

[57] ABSTRACT

A method of data transmission for a loop-linked processor system enabling an easy access to the internal memories of the processors which are normally not directly accessible from the data transmission loop. The method includes the steps of reserving one portion of each common memory for a command signal from one processor commanding to bring data in the internal memory of another processor to the common memory of the corresponding transmission controller: bringing data in the internal memory of one of the processors to the common memory of the corresponding transmission controller, only when the command signal from another processor is received; and reserving another portion of each common memory for those data originally in the internal memory of one processor which has been brought to the common memory of the corresponding transmission controller.

8 Claims, 3 Drawing Sheets

DATA COLLECTING METHOD AND APPARATUS FOR LOOP-LINKED CONTROL SYSTEM

BACKGROUND OF THE INVENTION

1. Field of the Invention

The present invention relates to a data collecting apparatus for a loop-linked control system, and more specifically to an apparatus for collecting data stored in an internal memory of each system controller for a control system linked by a close coupled data transmission loop.

2. Description of the Prior Art

A prior-art plane control system will be described hereinbelow as an example of loop-linked control systems to which a data collecting apparatus of the present invention is applied.

In the plant control system shown in FIG. 1, a plurality of data transmit controllers 2, 3 and 4 are linked by a high speed large capacity data transmission loop 1 (e.g. optical fiber loop). Each of these data transmit controllers 2, 3 and 4 is provided with a common memory $M_1$, $M_2$ or $M_3$, and connected to a plant controlling computer (CPU) 8 via an interface 5, to a process input/output (I/O) device 9 via an interface 6 and a plant controlling programmable controller (PC) 10 via an interface 7, respectively. Further, a sensor/actuator device 11 including various sensor, actuators (e.g. motors), indicators, terminals, etc. is connected to the process input/output (I/O) device 9. Further, although only a single plant controlling programmable controller 10 is shown in FIG. 1, in usual plural plant controlling programmable controllers 10 are connected to the close coupled data transmission loop 1 in order to distribute various functions of the system to the programmable controllers 10.

In the prior-art plant control system as shown in FIG. 1, process data outputted from the process I/O device 9 are momentarily transferred to the common memory $M_2$ via the interface 6 and stored therein, and control data outputted from the CPU 8 and the plant PC 10 are momentarily transferred to the common memory $M_1$ and $M_3$, respectively via the interfaces 5 and 7 and stored therein. Further, various data once stored in these common memories $M_1$, $M_2$ and $M_3$ are cyclically transferred between the three data transmit controllers 2, 3 and 4 via the data transmission loop 1. Accordingly, the most updated data of each of devices 8, 9 and 10 are stored in these common memories $M_1$, $M_2$ and $M_3$, and further the devices 8, 9 and 10 can obtain an easy access to the updated data stored in the common memories $M_1$, $M_2$ and $M_3$.

In the above prior-art control system, however, in case some accidents arise during plant control operation, there exists a need of collecting various data stored in the internal memory $M_i$ of the plant controlling programmable controller 10, for instance, in order to check the causes of the accidents. For doing this, the sensor/actuator device 11 is operated to execute a predetermined program so that data stored in the memory $M_i$ are first transferred to the common memory $M_3$, the common memory $M_2$ and then to an output terminal of the process I/O device 9, from which the data stored in the internal memory $M_i$ can be monitored through a recorder or on a display unit. However, since the data stored in the internal memory $M_i$ is not the common data cyclically transferred through the transmission loop 1, it has been necessary to use a special program maintenance tool or to modify input/output conversion addresses in the interface 6 or to alter programs of the plant controlling programmable controller 10, thus resulting in long time and much labor to collect data stored an internal memory of the plant controlling PC 10.

SUMMARY OF THE INVENTION

It is therefore an object of the present invention to provide a method and an apparatus of data transmission for a loop-linked processor system enabling an easy access to the internal memories of the processors which are normally not directly accessible from the data transmission loop.

According to one aspect of the present invention, there is a method of data transmission for a loop-linked processor system in which a plurality of processor means are linked together by a data transmission loop through a plurality of transmission controller means, each processor means having an internal memory not directly accessible from the data transmission loop, each transmission controller means having a common memory directly accessible from the transmission loop, the method including the steps of: reserving one portion of each common memory for a command signal from one processor means which instructs the bringing in of data in the internal memory of another processor means to the common memory of the corresponding transmission controller means; bringing data in the internal memory of one of the processor means to the common memory of the corresponding transmission controller means, only when the command signal from another processor means is received; and reserving another portion of each common memory for those data originally in the internal memory of one processor means which has been brought to the common memory of the corresponding transmission controller means.

According to another aspect of the present invention there is provided an apparatus of data transmission for a loop-linked processor system, including: a plurality of transmission controller means mutually communicable through a data transmission loop, each transmissions controller means having a common memory directly accessible from the transmission loop; a plurality of processor means each of which is linked to the data transmission loop through one of the transmission controller means, each processor means having an internal memory not directly accessible from the data transmission loop; one portion of each common memory being reserved for a command signal from one processor means which instructs the bringing in of data in the internal memory of another processor means to the common memory of the corresponding transmission controller means; data in the internal memory of one of the processor means being brought to the common memory of the corresponding transmission controller means, only when the command signal from another processor means is received; and another portion of each common memory being reserved for those data originally in the internal memory of one processor means which has been brought to the common memory of the corresponding transmission controller means.

In the data collecting apparatus for a loop-linked control system of the present invention, since the data collecting programmable controller and the monitor device and connected to the close coupled data transmission loop via the data transmit controllers, respectively, data stored in an internal memory of the system controller can be collected or monitored easily at high speed in the same way as data stored in the loop-linked common memories.

BRIEF DESCRIPTION OF THE DRAWINGS

The features and advantages of the data collecting apparatus for a loop-linked control system of the present invention will be more clearly appreciated from the following description taken in conjunction with the accompanying drawings in which like reference numeral designated corresponding elements and in which.

DETAILED DESCRIPTION OF THE PREFERRED EMBODIMENTS

An embodiment of the present invention will be described hereinbelow with reference to the attached drawings.

Figure 1:
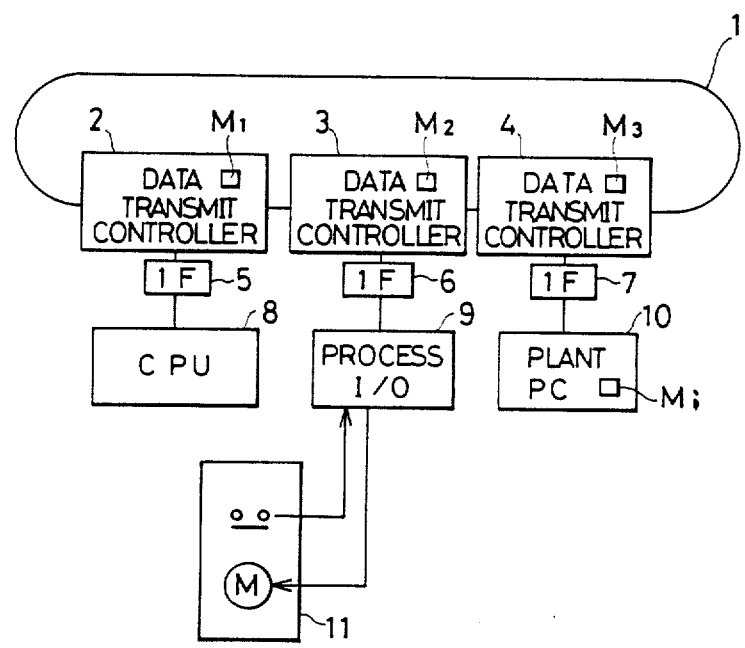
FIG. 1 is a schematic block diagram showing a prior-art loop-linked plant control system.
Figure 2:
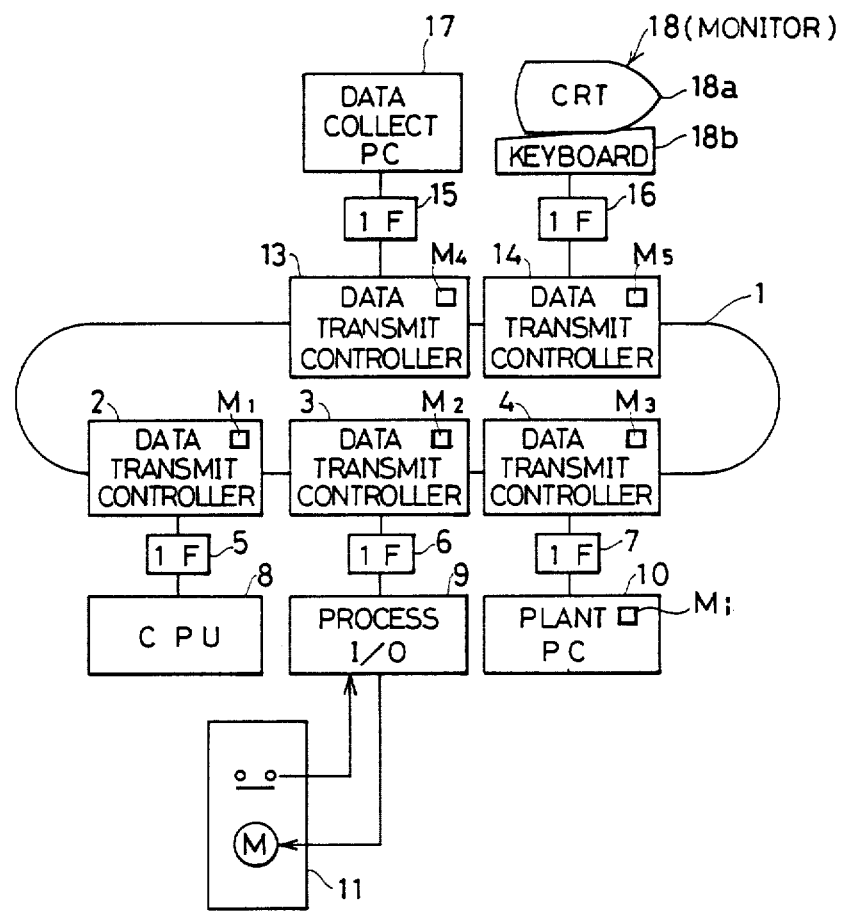
FIG. 2 is a schematic block diagram showing a loop-linked control system to which the data collecting apparatus of the present invention is applied.

FIG. 2 is a block diagram showing a plant control system provided with a data collecting apparatus of the present invention. That is, in FIG. 2, the data collecting apparatus of the present invention is additionally connected to the prior-art plant control system shown in FIG. 1. Therefore, the same reference numerals have been retained for similar sections which have the same functions.

The data collecting apparatus of the present invention comprises two data transmit controllers 13 and 14 connected to a data transmission loop 1, a data collecting programmable controller (data collect PC) 17 connected to the data transmit controller 13 via an interface 15, and a monitor device 18 having a cathode ray tube (CRT) 18a and a keyboard 18b and connected to the data transmit controller 14 via an interface 16. Each of the data transmit controllers 13 and 14 includes each common memory $M_4$ or $M_5$. Further, although not shown, a plurality of plant controlling programmable controller 10 are connected to the data transmission loop 1, in usual, through plural data transmit controllers, respectively.

Figure 3:
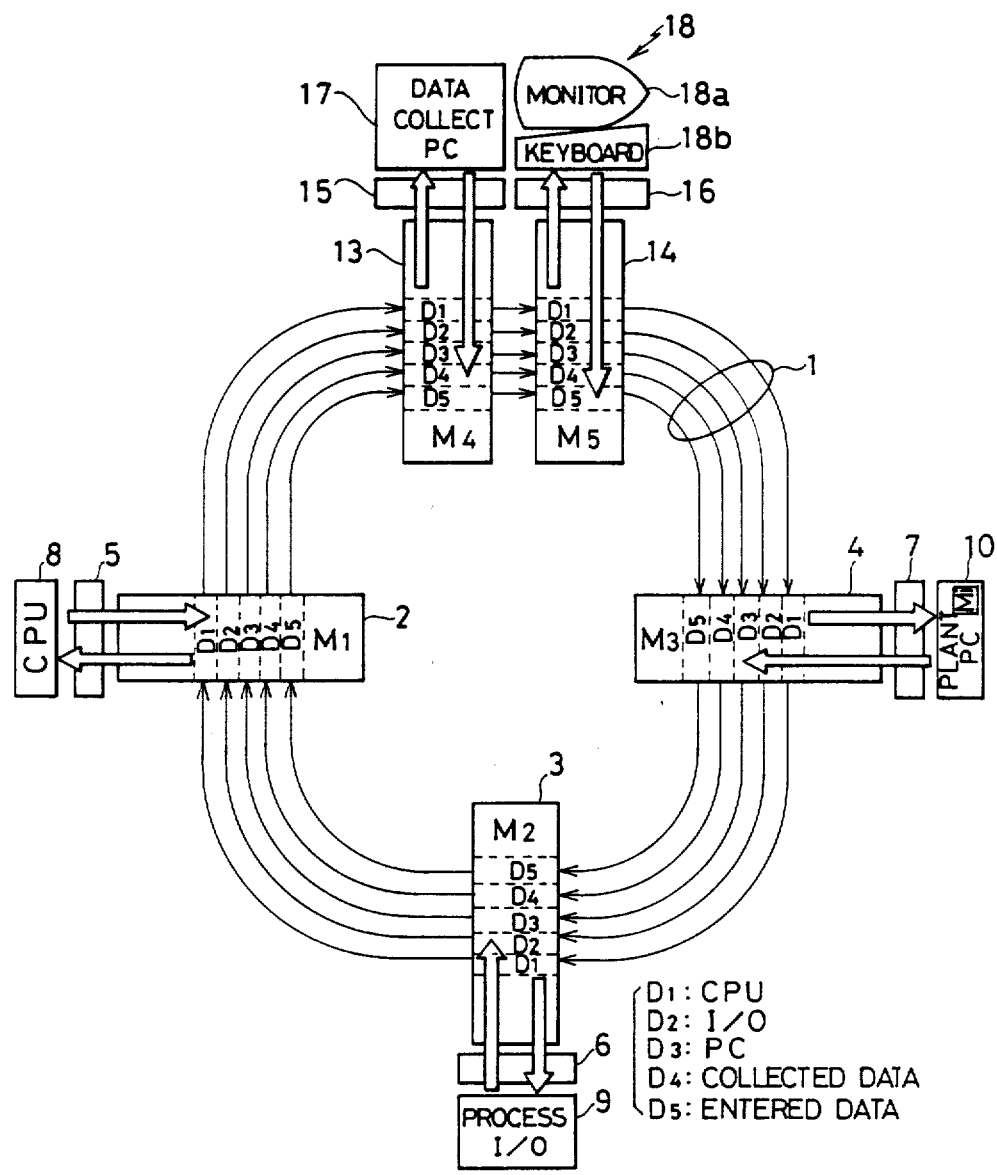
FIG. 3 is an illustration for assistance in explaining flows of data through a data transmission loop of the control system shown in FIG. 2.

As shown in FIG. 3, various process data outputted from a plant controlling computer (CPU) 8 are transferred to a first data address $D_1$ of the first common memory $M_1$ of the first data transmit controller 2 via the interface 5; those outputted from a process input/output device (I/O) 9 are transferred to the second data address $D_2$ of the second common memory $M_2$ of the second data transmit controller 3 via the interface 6; those outputted from a plant programmable controller (PPC) 10 are transferred to a third data address $D_3$ of the third common memory $M_3$ of the third data transmit controller 4 via the interface 7.

Further, various data outputted from the data collecting programmable controller 17 are transferred to a fourth data address $D_4$ of the fourth common memory $M_4$ of the fourth data transmit controller 13 via the interface 15; and those outputted from the monitor device 18 are transferred to a fifth data address $D_5$ of the fifth common memory $M_5$ of the fifth data transmit controller 14 via the interface 16.

Data outputted to the above common memories $M_1$, $M_2$, $M_3$, $M_4$ and $M_5$ are cyclically transferred along loop-linked data transmit controllers 2, 3, 4, 13 and 14, in such a way that the same updated data are overwritten at each data address $D_1$, $D_2$, $D_3$, $D_4$ or $D_5$ of each common memory $M_1$, $M_2$, $M_3$, $M_4$ or $M_5$.

Further, data stored at the data addresses $D_1$ to $D_5$ of the common memory 1 are transferred to the CPU 8 via the interface 5; data stored at the data address $D_1$ to $D_5$ of the common memory $M_2$ are transferred to the process I/O 9 via the interface 6; data stored at the data address $D_1$ to $D_5$ of the common memory $M_3$ are transferred to the plant PC 10 via the interface 7; data stored at the data address $D_1$ to $D_5$ of the common memory $M_4$ are transferred to the data collect PC 17 via the interface 15; and data stored at the data address $D_1$ to $D_5$ of the common memory $M_5$ are transferred to the monitor 18 via the interface 16.

In the above-mentioned plant control system, various data can be collected and monitored as follows:

Data stored at the address $D_1$ of the common memory $M_1$, the address $D_2$ of the common memory $M_2$, and the address $D_3$ of the common memory $M_3$ are collected by the data collecting programmable controller 17. In more detail, data of the CPU 8 are stored at the $D_1$ of $M_1$ and then transferred cyclically along the $D_1$ loop. In the same way, data of the process I/O 9 are stored at the $D_2$ of $M_2$ and then transferred cyclically along the $D_2$ loop, and data of the PC 10 are stored at the $D_3$ of $M_3$ and then transferred cyclically along the $D_3$ loop. Therefore, data of the CPU 8 can be collected to the data transmit PC 17 through the $D_1$ of $M_4$; data of the I/O 9 can be collected to the PC 17 through the $D_2$ of $M_4$; and data of the PC 10 can be collected to the PC 17 through the $D_3$ of $M_4$.

The collected data are stored at the address $D_4$ of the common memory $M_4$ and then transferred to the address $D_4$ of the common memory $M_5$. The transferred data at the address $D_4$ can be displayed on the CRT 18a of the monitor device 18 via the interface 16 for monitoring.

Data stored at the internal memory $M_i$ of the plant PC 10 can be collected or monitored as follows: Here, although a single plant PC 10 is shown in FIG. 3, in usual a plurality of plant PCs 10 are connected to the data transmit loop 1. The number of plant PC 10 from which internal data are required to be collected and a data collect command are entered through the keyboard 18b of the monitor 18. These entered data are written at the address $D_5$ of the memory $M_5$ and then transferred cyclically along the data address $D_5$ of the common memories $M_1$, $M_2$, $M_3$ and $M_4$ of the data transmit controllers 2, 3, 4 and 13.

Further, an input/output address conversion program which can determine an address of data required to output (read) and an address of data required to input (write) is provided in the interface 7 of each plant PC 10. Therefore, the data stored at the address $D_5$ can be read by the plant PC 10.

When the plant PC 10 reads the number of PC and the data collect command both entered through the keyboard 18b and determines that the PC number matches its own number, the PC 10 reads addresses of the internal memory $M_i$ and writes the read value at the address $D_3$ of the common memory $M_3$ of the data transmit controller 4 via the interface 7. The data written at $D_3$ of $M_3$ are transferred cyclically to the addresses $D_3$ of the other common memories $M_1$, $M_2$, $M_4$ and $M_5$.

The data collecting PC 17 can collect the data transferred to the address $D_3$ of $M_4$. Data collected by the data collect PC 17 are written at the address $D_4$ of the $M_4$ and then transferred to the address $D_4$ of $M_5$, so that the collected data can be monitored on the CRT 18a of the monitor device 18.

In this embodiment, when a computer (not shown) for analyzing the collected data is connected to the monitor device 18, it is also possible to automatically analyze the collected data stored in the internal memory $M_i$ of the plant PC 10.

As described above, data stored in the internal memory $M_i$ of the plant PC 10 can be written to the common memories $M_1$, $M_2$, $M_3$, and $M_4$ and $M_5$ and further can be collected by the data collect PC 17 easily at high speed. Further, even when the internal memory $M_i$ is provided for the CPU 8 or the process I/O 9, the above-mention data collection operation is the same.

Further, in the above embodiment, a pair of the data collect PC 17 and the monitor device 18 are provided for the plant control system; however, it is of course possible to use a single device provided with both the functions, such as a program loader, for instance.

Further, although the embodiment of the present invention has been described in relation to a plant control system, the data collecting apparatus of the present invention can be applied to various control system, without being limited to a plant control system. Further, since a CPU is usually included in each programmable controller, an independent CPU 8 is not necessarily required for the control system, according to the situation.

That is, in the above embodiment, the system in which the plant PC 10 and the process I/O 3 are connected to the transmission line 1 has been described by way of example. Without being limited to process data, however, the present invention can be applied to the system to which various business processing devices are connected.

As described above, since the data collecting apparatus of the present invention is connected to a data transmission loop for closely coupling various system controllers which constitute a control system, it is possible to read and collect data stored in the internal memory of each system controller as well as data stored in the common memories in on-line method at high speed, thus providing an operational flexibility in control systems for implementing data analysis, process monitoring, system maintenance, etc.

It is to be understood by those skilled in the art that the foregoing description is a preferred embodiment of the disclosed apparatus and that various changes and modifications may be made in the invention without departing from the sprite and scope thereof.

What is claimed is:

1. A method of data transmission for a loop-linked processor system in which a plurality of processor means are linked together by a data transmission loop through a plurality of transmission controller means, each processor means having an internal memory not directly accessible from the data transmission loop, each transmission controller means having a common memory directly accessible from the data transmission loop, the method comprising the steps of:

reserving a first portion of each common memory for a command signal from one processor means commanding to bring data in the internal memory of another processor means to the common memory of the corresponding transmission controller means;

bringing data in the internal memory of one of the processor means to the common memory of the corresponding transmission controller means, only when the command signal from another processor means is received; and reserving a second portion of each common memory for those data originally in the internal memory of one processor means which has been brought to the common memory of the corresponding transmission controller means.

2. The method of claim 1, further comprising the step of registering those data originally in the internal memory of one processor means which has been brought to the common memory of the corresponding transmission controller means, into said second portion of each common memory reserved for such data.

3. The method of claim 1, further comprising the step of monitoring those data originally in the internal memory of monitoring those data originally in the internal memory of one processor means which has been brought to the common memory of the corresponding transmission controller means.

4. The method of claim 1, further comprising the step of controlling an entire loop-linked processor system by one of the processor means.

5. An apparatus of data transmission for a loop-linked processor system, comprising:

a plurality of transmission controller means mutually communicable through a data transmission loop, each transmission controller means having a common memory directly accessible from the data transmission loop;

a plurality of processor means each of which is linked to the data transmission loop through one of the transmission controller means, each processor means having an internal memory not directly accessible from the data transmission loop;

a first portion of each common memory being reserved for a command signal from one processor means commanding to bring data in the internal memory of another processor means to the common memory of the corresponding transmission controller means;

data in the internal memory of one of the processor means being brought to the common memory of the corresponding transmission controller means, only when the command signal from another processor means is received; and a second portion of each common memory being reserved for those data originally in the internal memory of one processor means which has been brought to the common memory of the corresponding transmission controller means.

6. The apparatus of claim 5, wherein one of the processor means is a programmable controller for registering those data originally in the internal memory of one processor means which has been brought to the common memory of the corresponding transmission controller means, into said second portion of each common memory reserved for such data.

7. The apparatus of claim 5, wherein one of the processor means is a monitor means by which those data originally in the internal memory of one processor means which has been brought to the common memory of the corresponding transmission controller means can be monitored.

8. The apparatus of claim 5, wherein one of the processor means is a central processing unit for controlling an entire loop-linked processor system.

* * * * *